United States Patent [19]

Engbersen et al.

[11] Patent Number: 5,486,559

[45] Date of Patent: Jan. 23, 1996

[54] OPTICALLY NON-LINEAR ACTIVE WAVEGUIDING MATERIAL COMPRISING DONOR AND ACCEPTOR GROUPS-CONTAINING TRIPHENYLCARBINOLS

[75] Inventors: Johannes F. J. Engbersen, Ede; Erik Kelderman, Enschede; David N. Reinhoudt, Henegelo; Willem Verboom, Vriezenveen, all of Netherlands

[73] Assignee: Akzo Nobel NV, Arnhem, Netherlands

[21] Appl. No.: 289,044

[22] Filed: Aug. 11, 1994

[30] Foreign Application Priority Data

Aug. 19, 1993 [EP] European Pat. Off. ............ 93202453

[51] Int. Cl.$^6$ .............................. C08K 5/13; C08K 5/05; G02B 6/00
[52] U.S. Cl. ..................... 524/299; 524/290; 524/291; 524/292; 524/293; 524/369; 524/384; 385/128; 385/147
[58] Field of Search ................... 524/369, 384, 524/292, 288, 289, 290, 291, 293, 299; 385/128, 147

[56] References Cited

U.S. PATENT DOCUMENTS

| | | | |
|---|---|---|---|
| 3,541,116 | 11/1970 | Beeker | 552/115 |
| 4,346,187 | 8/1982 | Nichols | 524/384 |
| 4,838,634 | 6/1989 | Bennion et al. | 350/96.11 |
| 4,936,645 | 6/1990 | Yoon et al. | 350/96.11 |

FOREIGN PATENT DOCUMENTS

| | | | |
|---|---|---|---|
| 0917529 | 1/1947 | France | 524/384 |
| 2189624 | 10/1987 | United Kingdom | G02B 6/10 |

OTHER PUBLICATIONS

Physical Review Letters, vol. 66, No. 23, pp. 2980–2983 (Jun. 10, 1991).
Carpenter, et al. J. Org. Chemistry, 50(22): 4362–4368, 1985.
Doadt, et al. Tetrahedron Letters, 26(9): 1149–1152, 1985.
Fitt, J. J. et al. J. Org. Chemistry, 41(25): 4029–4031, 1976.
Nishimoto, et al. Chem. Abstracts, 101(19) 170383 y, 1984.
Takahashi, et al, Quant. Struct.–Act. Relat. 6(1): 17–21, 1987.
White, et al, Pesticide Biochemistry and Physiol, 25:188–204, 1986.

*Primary Examiner*—Paul R. Michl
*Assistant Examiner*—Olga Asinovsky
*Attorney, Agent, or Firm*—Richard P. Fennelly; Louis A. Morris

[57] ABSTRACT

The invention relates to an optically non-linear active waveguiding material comprising an optically transparent polymer and a donor group and acceptor group-containing triphenylcarbinol as a dopant. Said dopants have a high hyperpolarizability and have a charge-transfer absorption band which is about the same as that of their corresponding compounds having only one donor-π-acceptor unit. The triphenylcarbinols were found to display good solubility in polymers. Nitro-functionalized triphenylcarbinols are preferred because of their charge-transfer absorption band at a low wavelength ($\lambda_{max}$ at about 290 nm). Aldehyde-functionalized calix(4)arenes were also found to have this low wavelength charge-transfer absorption band ($\lambda_{max}$ at about 270 nm). Triphenyls comprising stilbene donor-π-acceptor units are preferred because of their high hyperpolarizability.

5 Claims, No Drawings

OPTICALLY NON-LINEAR ACTIVE WAVEGUIDING MATERIAL COMPRISING DONOR AND ACCEPTOR GROUPS-CONTAINING TRIPHENYLCARBINOLS

The invention relates to an optically non-linear active waveguiding material comprising an optically transparent polymer and an optically non-linear active dopant comprising a donor-π-acceptor unit.

In optically non-linear materials, non-linear polarisation occurs under the influence of an external field of force (such as an electric field of force). In the case of organic molecules this is called an induced dipole moment. The induced dipole moment ($\mu_{ind}$) may be represented as follows:

$$\mu_{ind} = \alpha E + \beta EE + \gamma EEE + \quad [1]$$

wherein α stands for the linear hyperpolarisability, β represents the (non-linear) hyperpolarisability, γ stands for the second hyperpolarisability, etc.

Non-linear electric polarisation (β and γ do not equal zero) may give rise to a number of optically non-linear phenomena, such as frequency doubling and Pockels effect. By utilising these phenomena it is possible to employ this material in optically active waveguiding structures such as optical switches, frequency doublers, etc.

To this end the organic, optically non-linear active material should be applied to a substrate in the form of thin layers with the aid of one of three suitable polymer systems: guest-host polymer systems, functionalised polymers, and polymer networks. In the first system, which is by far the easiest to prepare, an optically transparent polymer contains optically non-linear active compounds as dopants. Such an optically non-linear active waveguiding material is disclosed in GB 2 189 624, where an optically transparent polymer is impregnated with an optically non-linear dopant comprising a donor-π-acceptor unit.

Most organic, optically non-linear active compounds owe their non-linear optical properties to so-called donor-π-acceptor units. By this term are meant, groups composed of an electron-donating group and an electron-accepting group coupled to the same conjugated π-system Compounds containing such a material were found to have a comparatively high hyperpolarisability (β).

For several years now efforts have been made in industry to prepare materials of a higher hyperpolarisability, for instance by expanding the donor-π-acceptor units. While the hyperpolarisability is thus increased, there is, simultaneously, a shift in the charge-transfer absorption band to a longer wavelength. In consequence, this material has limited applicability in the case of, say, frequency doubling. For, it is inadvisable for the optically non-linear material to have absorption bands in the very working range in which frequency doubling is to be carried out: ordinarily, electromagnetic radiation having a wavelength of 700 to 1300 nanometers (nm) is passed through a frequency doubler by means of a laser, which results in a light source emitting a wavelength of half that length, i.e., in the range of approximately 350 to 650 nm. Preparing an optically non-linear active material without any absorption bands in the 350 to 650 nm range proved to be a difficult affair.

The present invention has for its object to obviate these drawbacks and provide an optically non-linear active waveguiding material comprising dopants of high hyperpolarisability. To this end, the invention consists in that the optically non-linear active dopant is a donor and acceptor groups-containing triphenylcarbinol. In the present specification the term triphenylcarbinol comprises triphenylcarbinols as well as methyl ethers of triphenylcarbinols. For convenience also the methyl ethers of triphenylcarbinols are called triphenylcarbinol (TPC).

The dopant

In TPCs the three aromatic rings are connected to a central $sp^3$ hybridised carbon atom. TPCs with donor and acceptor groups substituted at the 2- and 5-positions of the aromatic rings, respectively, have a high hyperpolarisability (β). Further, it was found that these kinds of dopants comprising more than one donor-π-acceptor unit side by side in one molecule have a charge-transfer absorption band wavelength which is about the same as that for dopants with only one donor-π-acceptor unit.

Other dopants having more than one donor-π-acceptor unit are described in U.S. Ser. No. 08/088,140, filed Jul. 7, 1993.

Suitable donor groups with which the 2-position of the aromatic rings may be functionalised include: alkoxy groups, aryloxy groups, amino groups (—NR$_2$, —NHR, —NH$_2$), amido groups, provided that their coupling is via the nitrogen atom (—NHCOR), hydroxylgroups, —O$^-$, —S$^-$, ester groups, provided that their coupling is via the oxygen atom of the alcohol (—OCOR), thiol ethers (—SR), mercapto groups (—SH), halogens (F, Cl, Br, I), alkyl groups, and aryl groups. R in this case represents alkyl groups in general.

Suitable acceptor groups with which the 5-position of the aromatic ring may be substituted include: cyano groups, carboxylic acids, carboxylic esters, provided that their coupling is via the acidic carbon atom (—COOR), amido groups, provided their coupling is via the acidic carbon atom (—CONH$_2$, —CONHR, CONR$_2$), aldehyde groups, ketone groups, sulphonyl groups (—SO$_2$R, SO$_2$CH$_3$), sulphonate groups (—SO$_2$OR), nitro groups, substituted stilbene groups, such as nitrostilbene groups, cyanostilbene groups, and sulphonyl stilbene groups, substituted azo compounds, such as p.nitro azobenzene, cyano azobenzene, and sulphonyl azobenzene, substituted benzylidene aniline compounds such as cyanobenzylidene aniline, nitrobenzylidene aniline compounds, and aryl groups. Aryl groups may function as donors as well as acceptors.

Functionalisation of the triphenylcarbinols

Methoxy functionalised TPCs at the 2-position may be obtained by the reaction of 6-bromo-2-methylanisole with methyl (2-methoxy-3-methyl)benzoate in the presence of tert.-butyllithium in THF. The 6-bromo-2-methylanisole may be obtained by bromination of o-cresol to give 6-bromo-2-methylphenol, followed by alkylation of the hydroxyl group with methylsulphate.

The methoxy functionalised TPC may be functionalised with acceptor groups at the 5-position. The 5-nitro substitution may be effected by reaction of the methoxy functionalised TPC with copper(II)nitrate hexahydrate in acetic anhydride. Substitution with a bromine atom at the 5-position is effected by the reaction of methoxy functionalised TPC with N-bromosuccinimide in DMF in the dark.

The methyl ether of the 5-bromo-substituted TPC may be obtained by methylation with methyl iodide in THF and NaH as a base.

The replacement of the bromo atoms by formyl groups is effected with the aid of tert.-butyllithium. For the synthesis of compounds with longer conjugated π systems to form stilbene donor-π-acceptor units the aldehyde functionalised TPC may be reacted with p-cyanobenzyl phosphonate or p-nitrobenzyl phosphonate under Wittig-Horner conditions.

Because of their charge-transfer absorption band at a low wavelength ($\lambda_{max}$ at about 290 nm), nitro-functionalised TPCs are preferred. Aldehyde-functionalised TPCs were also found to have this low wavelength charge-transfer absorption band ($\lambda_{max}$ at about 270 nm). In consequence, optically non-linear active waveguiding material comprising these dopants is pre-eminently suited to be used for frequency doubling, e.g., for frequency doublers which generate blue light. TPCs satisfying formula 2 below therefore are especially preferred.

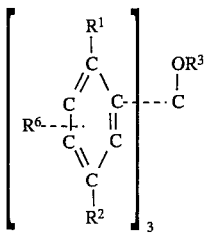

Formula 2 wherein:

R$^1$ stands for —O-alkyl having 1–30 carbon atoms, O-aryl having 1–30 carbon atoms, —NH$_2$, —NHR$^4$, —NR$^4$R$^4$, —NHCOR$^4$, —OH, —O$^-$, —SH, —S$^-$, SR$^4$, —OCOR$^4$, —F, —Cl, —I, —Br, —R$^4$, —R$^5$, R$^2$ stands for —NO$_2$, an aldehyde group having 1–30 carbon atoms, R$^3$ stands for —H or —CH$_3$, R$^4$ represents an alkyl group having 1–30 carbon atoms, R$^5$ represents an aryl group having 1–30 carbon atoms, R$^6$ represents —H or an alkyl group having 1–3 carbon, atoms.

TPCs comprising stilbene donor-π-acceptor units turned out to have a very high hyperpolarizability β. TPCs satisfying Formula 3 below therefore are especially preferred.

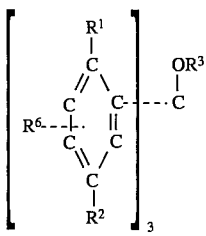

Formula 3 wherein:

R$^1$ stands for —O-alkyl having 1–30 carbon atoms, O-aryl having 1–30 carbon atoms, —NH$_2$, —NHR$^4$, —NR$^4$R$^4$, —NHCOR$^4$, —OH, —O$^-$, —SH, —S$^-$, SR$^4$, —OCOR$^4$, —F, —Cl, —I, —Br, —R$^4$, —R$^5$, R$^2$ stands for —CH=CH—C$_6$H$_4$—NO$_2$, —CH=CH—C$_6$R$^4$H$_3$—NO$_2$, —CH=CH—C$_6$H$_4$—CN, —CH=CH—C$_6$R$^4$H$_3$—CN, —CH=CH—C$_6$H$_4$—SO$_2$, —CH=CH—C$_6$R$^4$H$_3$—SO$_2$, —CH=CH—C$_6$H$_4$—SO$_2$O, —CH=CH—C$_6$R$^4$H$_3$—SO$_2$O, R$^3$ stands for —H or —CH$_3$, R$^4$ represents an alkyl group having 1–30 carbon atoms, R$^5$ represents an aryl group having 1–30 carbon atoms, R$^6$ represents —H or an alkyl group having 1–3 carbon atoms.

The host polymer

In principle, all optically transparent polymers that can be used in polymeric optical waveguides in the ordinary course of events may serve as hosts to an optically non-linear active dopant according to the invention. With optically transparent is meant: substantially transparent in the wavelength range wherein the waveguide is used. Examples of such polymers include polyalkyl acrylates, notably polymethyl (meth)acrylate, polycarbonates, polyesters, polystyrene, and fluor-and/or chlorine-containing polymers, notably vinylidene difluoride polymers. Preference is given to the use of polymethyl methacrylate or polystyrene, since these polymers constitute superior media for dissolving the dopants in.

Generally, waveguiding structures are shaped like a flat waveguide with a so-called sandwich structure. The person of average skill in the art will be familiar with the composition and preparation thereof, which require no further elucidation here. The optically non-linear active dopants according to the invention can easily be admixed with the host polymer prior to the forming of a film thereof on a substrate.

The invention will be further illustrated with reference to several unlimitative examples.

EXAMPLES

EXAMPLE 1

Synthesis Of TPC 1

6-bromo-1-methoxy-2-methylbenzene was obtained by using the procedures described in *Tetrahedron*, Vol. 35 (1979), p. 2169 and *Synthesis*, (1979), p.428, being a modified procedure of the one described in *J. Am. Chem. Soc.*, Vol. 74 (1952), p. 3011.

The preparation of methyl (2-methoxy-3-methyl)benzoate

To a suspension of 50 g (1.29 moles) 3-methylsalicyclic acid in 850 ml acetonitrile were added 33 g (0.83 moles) NaOH and 120 ml (1.29 moles) dimethyl sulphate. After 48 hours of vigorous stirring the suspension was acidified slightly by the addition of a 1M HCl solution. The product was taken up in 1 l diethyl ether, washed with saturated solutions of NaHCO$_3$ (three times 250 ml), ammonia (twice 200 ml) and NaCl (twice 200 ml) dried over MgSO$_4$, and evaporated in vacuo. Column chromatography (SiO$_2$, P.E.:EtOAc 10:1) yielded 50 g (0.27 mol) methyl(2-methoxy-3-methyl)benzoate as an oil. Yield 83%; boiling point 130°–131° C. (17 mm Hg); $^1$H NMR δ7.6-6.9 (m, 3 H, Ar H), 3.82 (s, 3 H, CO$_2$CH$_3$), 3.75 (s, 3 H, ArOCH$_3$), 2.23 (s, 3 H, ArCH$_3$); $^{13}$C NMR δ164.5 (s, ArC—O), 156.1 (s, CO$_2$), 132.8, 126.8 and 121.2 (d, Ar C), 130.4 and 122.3 (s, Ar C), 59.1 (q, CO$_2$CH$_3$), 49.8 (q, OCH$_3$), 13.7 (q, CH$_3$); IR (KBr) 1730 (C=O) cm$^{-1}$; mass spectrum, m/e 180.080 (M$^+$, calculated 180.079).

The preparation of 2-methoxy-3-methyl -α,α-bis(2-methoxy-3-methylphenyl)-benzenemethanol (TPC 1)

To a solution of 6-bromo-1-methoxy-2-methylbenzene (52 g, 0.26 moles) in THF (500 ml) was added tert-BuLi (95 ml of 1.5M in pentane, 2.0 mol) at −78° C. and the mixture was stirred for 10 min. Subsequently methyl(2-methoxy-3-methyl)benzoate (23 g, 0.13 moles) was added slowly and the reaction mixture was allowed to warm to room temperature overnight. Most of the THF was removed under reduced pressure and the mixture was acidified to neutral pH by addition of a 1M HCl solution. The product was taken up in diethyl ether (500 ml), washed with saturated solutions of NaHCO$_3$ (3×200 ml) and NaCl (2×200 ml), dried over MgSO$_4$ and evaporated in vacuo to yield TPC 1 (32 g, 0.083 moles) as a white powder. Yield 65%; melting point 135°–136° C.; $^1$H NMR δ7.1-6.9 (m, 9 H, Ar H), 5.90 (s, 1

H, OH), 3.22 (s, 9 H, ArOCH$_3$), 2.29 (s, 9 H, ArCH$_3$); $^{13}$C NMR δ157.2 (s, ArC—O), 139.4 and 131.4 (s, Ar C), 131.1, 127.8 and 122.9 (d, Ar C), 81.4 (s, COH), 60.0 (q, ArOCH$_3$), 17.0 (q, ArCH$_3$); IR (KBr) 3480 (OH) cm$^{-1}$; mass spectrum, m/e 392.197 (M$^+$, calcd 392.199).

EXAMPLE 2

Synthesis Of TPC 2

The preparation of 2-methoxy-3-methyl-5-nitro-α,α-bis(2-methoxy-3-methyl- 5-nitrophenyl)-benzenemethanol (TPC 2)

To copper(II) nitrate.hexahydrate (18 g, 75 mmoles) was added acetic anhydride (60 ml, 0.53 mol) and the mixture was stirred for 0.5 hours at 35° C. to form the nitrating agent diacetyl orthonitric acid. TPC 1 (1.00 g, 0.25 mmoles) dissolved in acetic anhydride (10 ml) was added slowly to the solution. After stirring for 10 min, water (100 ml) was added slowly to the mixture and the precipitated product was filtered off, washed with water (2×25 ml), saturated NaHCO$_3$ (3×25 ml) and water (2×25 ml). The product was taken up in CH$_2$Cl$_2$ (25 ml) dried over MgSO$_4$ and evaporated in vacuo. The residue was purified by column chromatography (SiO$_2$, P.E.:EtOAC 5:1) and recrystallized from MeOH to give pure TPC 2 (0.12 gram, 0.23 mmoles). Yield 9%; melting point 223°–225° C.; $^1$H NMR δ8.13 (d, 3 H, J=2.5 Hz, Ar H), 7.95 (d, 3 H, J=2.7 Hz, Ar H), 5.72 (s, 1 H, OH), 3.40 (s, 9 H, ArOCH$_3$), 2.42 (s, 9 H, ArCH$_3$); $^{13}$C NMR δ162.0 (s, ArC—O), 143.0 (ArC—NO$_2$), 138.2 and 133.2 (s, Ar C), 127.3 and 123.0 (d, Ar C), 80.1 (s, COH), 60.8 (q, ArOCH$_3$), 17.6 (q, ArCH$_3$); IR (KBr) 1522 and 1343 (NO$_2$) cm$^{-1}$; mass spectrum m/e 527.156 (M$^+$, calcd 527.154); UV (CHCl$_3$) λmax=290 nm, ε=25 000 l.mol$^{-1}$.cm$^{-1}$.

EXAMPLE 3

Synthesis Of TPC 3

The preparation of 5-bromo-2-methoxy-3-methyl-α,α-bis(5-bromo-2-methoxy- 3-methylphenyl)-benzenemethanol (TPC 3)

To a solution of TPC 1 (10.0 g, 0.025 moles) in DMF (600 ml) in a dark flask was added N-bromosuccinimide (18.6 g, 0.105 moles) in DMF (600 ml). After stirring for 5 days at 50° C. the DMF was removed under reduced pressure, and the product was taken up in diethyl ether (1 l), washed with saturated solutions of NaHCO$_3$ (3×500 ml) and NaCl (2×400 ml), dried over MgSO$_4$, and evaporated in vacuo. The solid product was washed with cold methanol (100 ml) to yield TPC 3 (11.8 g, 0.018 moles) as a white powder. Yield 75%; melting point 112°–115° C.; $^1$H NMR δ7.28 (s, 3 H, Ar H), 7.11 (s, 3, H, Ar H), 5.79 (s, 1 H, OH), 3.24 (s, 9 H, ArOCH$_3$), 2.27 (s, 9 H, ArCH$_3$); $^{13}$C NMR δ156.1 (s, ArC—O), 140.0 and 133.8 (s, Ar C), 134.2 and 130.4 (d, Ar C), 116.0 (s, ArC—Br), 80.2 (s, COH), 60.2 (q, ArOCH$_3$), 17.0 (q, ArCH$_3$); IR (KBr) 3490 (OH) cm$^{-1}$; mass spectrum, m/e 625.929 (M$^+$, calculated for C$_{25}$H$_{25}$$^{79}$Br$_3$O$_4$: 625.930).

EXAMPLE 4

Synthesis Of TPC 4

The preparation of 5-bromo-2-methoxy-3-methyl-α,α-bis(5-bromo-2-methoxy- 3-methylphenyl)-benzenemethanol methyl ether (TPC 4)

To a suspension of NaH (1.0 g, 33 mmoles) in THF (20 ml) was added a solution of TPC 3 (3.0 g, 4.8 mmoles) in THF (40 ml). After 30 minutes excess methyl iodide (6.0 ml) was added and the mixture was stirred at 35° C. for 16 hours. The reaction was quenched by the addition of water (100 ml). The product was taken up in diethyl ether (100 ml), washed with water (2×150 ml), dried over MgSO$_4$, and evaporated in vacuo to give TPC 4 (2.58 g, 4.0 mmoles) as a white powder. Yield 84%; melting point 197°–202° C.; $^1$H NMR δ7.3-7.2 (m, 6 H, Ar H), 3.32 (s, 9 H, ArOCH$_3$), 2.99 (s, 3 H, COCH$_3$), 2.25 (s, 9 H, ArCH$_3$); $^{13}$C NMR δ156.6 (s, ArC—O), 135.7 and 133.6 (s, Ar C), 133.9 and 131.6 (d, Ar C), 115.1 (s, ArC—Br), 86.8 (s, COCH$_3$) 60.1 (q, ArOCH$_3$), 53.7 (q, OCH$_3$), 17.2 (q, ArCH$_3$); mass spectrum, m/e 643.212 (M$^+$, calulated for C$_{26}$H$_{27}$$^{79}$Br$_3$O$_4$: 643.215).

EXAMPLE 5

Synthesis Of TPC 5

Preparation of 5-formyl-2-methoxy-3-methyl-α,α-bis(5-formyl-2-methoxy- 3-methylphenyl)-benzenemethanol methyl ether (TPC 5)

To a solution of 9 (1.0 g, 1.6 mmoles) in THF (60 ml) was added t-BuLi (4.0 ml of 1.5M in pentane, 6.0 mmoles) at −78° C., and the mixture was stirred at −50° C. for 30 minutes. Subsequently the mixture was cooled to −78° C. and DMF (1.5 ml, 19.4 mmoles) was added, whereupon the reaction mixture was allowed to warm to room temperature. Most of the THF was removed under reduced pressure, and the mixture was acidified to neutral pH by the addition of a 1M HCl solution. The product was taken up in diethyl ether (40 ml), washed with saturated solutions of NaHCO$_3$ (3×50 ml) and NaCl (2×50 ml), dried over MgSO$_4$, and evaporated in vacuo to yield TPC 5 (0.8 g, 0.96 mmoles) as a white foam. Yield 60%; melting point 184°–187° C. (CH$_2$Cl$_2$/P.E.); $^1$H NMR δ9.88 (s, 3 H, CHO), 7.69 (s, 6 H, Ar H), 3.40 (s, 9 H, ArOCH$_3$), 3.06 (s, 3 H, COCH$_3$), 2.36 (s, 9 H, ArCH$_3$); $^{13}$C NMR δ191.6 (d, CHO), 162.9 (s, ArC—O), 134.5, 132.5 and 130.7 (s, Ar C), 133.1 and 131.1 (d, Ar C), 87.1 (s, COCH$_3$), 60.3 (q, ArOCH$_3$), 53.7 (q, OCH$_3$), 17.0 (q, ArCH$_3$); IR (KBr) 1692 (C═O) cm$^{-1}$; mass spectrum, m/e 490.197 (M$^+$, calcd 490.199); UV (CHCl$_3$) λ=272 nm, ε=34 000 l.mole$^{-1}$.cm$^{-1}$.

EXAMPLE 6

Synthesis Of TPC 6

Preparation of 5-[(E)-1-(4-cyanophenyl)ethenyl]-2-methoxy-3-methyl-α,α-bis-( 5-[(E-1-(4-cyanophenyl)ethenyl]-2-methoxy- 3-methylphenyl)-benzenemethanol methyl ether (TPC 6)

para-Cyanobenzyl phosphonate (0.89 g, 3.50 mmoles) was added slowly to a suspension of NaH (0.5 g, 16.7 mmoles) in DMF (30 ml) and the reaction mixture was stirred riot 7 minutes in a dark flask. Subsequently, a solution of TPC 5 (0.50 g, 1.02 mmoles) in DMF (10 ml) was added dropwise in 5 minutes and stirring was continued for 19 hours. Ethyl acetate (75 ml) was added to the mixture, and the organic layer was washed with a saturated aqueous solution of $NH_4Cl$ (5×50 ml), dried over $MgSO_4$. The solvent was removed under reduced pressure. The residue was purified by repeated recrystallization from $CH_3CN$/MeOH to give TPC 6 (0.25 g, 0.32 mmoles) as a white powder. Yield 32%; melting point 145°–147° C.; $^1H$ NMR δ7.60 (d, 6 H, J=8.3 Hz, Ar H), 7.52 (d, 6H, J=8.3Hz, ArH), 7.40 (d, 6H, J=2.5Hz, ArH), 7.15(d, 3H, J=16.3 Hz, CH=CH), 6.91 (d, 3 H, J=16.3 Hz, CH=CH), 3.33 (s, 9 H, $ArOCH_3$), 3.13 (s, 3 H, $COCH_3$), 2.32 (s, 9 H, $ArCH_3$); $^{13}C$ NMR δ158.4 (s, ArC—O), 87.6 (s, $COCH_3$), 60.1 (q, $ArOCH_3$), 53.9 (q, $OCH_3$), 17.8 (q, $ArCH_3$); IR (KBr) 2225 (CN) cm 1; mass spectrum, m/e 787.342 ($M^+$, calculated 787.341); UV ($CHCl_3$) λmax=340 nm, ε=60 000 l.mole$^{-1}$.cm$^{-1}$.

EXAMPLE 7

Synthesis Of TPC 7

Preparation of
2-methoxy-3-methyl-5-[(E)1-(4-nitrophenyl)ethenyl]
-α,α,-bis-( 2-methoxy-3-methyl
-5-[(E)1-(4-nitrophenyl)ethenyl]-phenyl)
benzenemethanol methyl ether (TPC 7)

para-Nitrobenzyl phosphonate (2.21 g, 0.66 mmoles) was added slowly to a suspension of NaH (0.5 g, 15.7 mmoles) in DMF (75 ml) and the reaction mixture was stirred for 1 hour. A solution of TPC 5 (0.66 g, 1.35 mmoles) in DMF (10 ml) was added dropwise in 5 minutes and subsequently the mixture was stirred for 3 hours. Water (25 ml) was added to the mixture and the precipitated product was filtered off and washed with water (3×25 ml). The residue was purified by column chromatography ($SiO_2$, $CH_2Cl_2$) to yield TPC 7 (0.19 gram, 0.23 mmoles) as a yellow powder. Yield 17%; melting point 170°–172° C.; $^1H$ NMR δ8.18 (dd, 6 H, J=8.8 and 2.5 Hz, Ar H), 7.58 (d, 6H, J=8.9Hz, ArH), 7.44 (d, 6H, J=2.9Hz, ArH), 7.22 (d, 3H, J=16.3 Hz, CH=CH), 6.98 (d, 3 H, J=16.3 Hz, CH=CH), 3.37 (s, 9 H, $ArOCH_3$), 3.16 (s, 3 H, $COCH_3$), 2.38 (s, 9 H, $ArCH_3$); $^{13}C$ NMR δ158.0 (s, ArC—O), 146.5 (s, ArC—$NO_2$), 87.6 (s, $COCH_3$), 60.2 (q, $ArOCH_3$), 53.9 (q, $OCH_3$), 17.5 (q, $ArCH_3$); IR (KBr) 1339 and 1513 ($NO_2$) cm$^{-1}$; FAB mass spectrum (NBA), m/e 847.4 ($M^+$, calculated 847.3); UV ($CHCl_3$) λmax=376 nm, ε=60 000 l.mole$^{-1}$. cm$^{-1}$.

The dipole moments of the TPCs 2, 3, 4, and 5 were determined by measuring the dielectric constant of the solutions with a capacitance bridge. For reference also the dipole moments of comparative compounds according to Formula 4 were measured. The dipole moments (μ in Debye=3.33564 * $10^{-30}$ C.m) are compiled in TABLE I. This table also lists the charge-transfer absorption bands (λmax measured in chloroform in nm.)

Formula 4 wherein for:
  comp. 1: $R^7=NO_2$,
  comp. 2: $R^7=CHO$,
  comp. 3: $R^7=(E)CH=CHC_6H_4CN$,
  comp. 4: $R^7=(E)CH=CHC_6H_4NO_2$.

The hyperpolarisabilities (β) of TPCs 2, 3, 4, 5 and comparative compounds 1–4 have been determined with HRS techniques, which are described in *Phys. Rev. Lett.*, Vol. 66 (1991), p. 2980. The β-values measured at 1064 nm are compiled in TABLE I.

TABLE I

| compound | μ (D) | β (in $10^{-30}$ esu) | λmax (in nm) |
|---|---|---|---|
| TPC 2 | 6 | 15 | 290 |
| Comp. 1 | 4.6 | 12 | 302 |
| TPC 3 | 4.3 | 14 | 272 |
| Comp. 2 | 3.2 | 9 | 269 |
| TPC 4 | 3.3 | 80 | 340 |
| Comp. 3 | 5.4 | 47 | 340 |
| TPC 5 | 4.6 | 338 | 376 |
| Comp. 4 | 4.5 | 105 | 377 |

The TPCs all turned out to have a higher hyperpolarisability β than their corresponding comparative compounds, having only one donor-π-acceptor unit. Further, from TABLE I it can be seen that the charge-transfer absorption bands of the TPCs are almost identical with their corresponding comparative compounds. This means that there is no shift in the charge-transfer absorption band.

We claim:
1. An optically non-linear active waveguiding material comprising an optically transparent polymer and an optically non-linear active dopant comprising a donor-π-acceptor unit, characterised in that the optically non-linear active dopant is a donor and acceptor groups-containing triphenylcarbinol.

2. An optically non-linear active waveguiding material according to claim 1, characterised in that the donor and acceptor groups-containing triphenylcarbinol satisfies Formula 1:

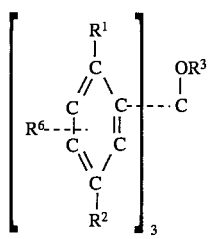

Formula 1 wherein:
  $R^1$ stands for —O-alkyl having 1–30 carbon atoms, —O-aryl having 1–30 carbon atoms, —$NH_2$, —$NHR^4$, —$NR^4R^4$, —$NHCOR^4$, —OH, $\_O^-$, —SH, —$S^-$, $SR^4$, —$OCOR^4$, —F, —Cl, —I, —Br, —$R^4$, —$R^5$,
  $R^2$ stands for —$NO_2$, —CN, —$R^4COOH$, —$R^5COOH$, —$R^4COONa$, —$R^5COONa$, —$COOR^4$, —$COOR^5$, —$CONH_2$, —$CONHR^4$, —$CONR^4R^4$, —$CONHR^5$, —$R^5$, an aldehyde group having 1–30 carbon atoms, a ketone group having 1–30 carbon atoms, —$SO_2R^4$, —$SO_2OR^4$, —$SO_2R^5$, —$SO_2OR^5$, —CH=CH—$C_6H_4$—$NO_2$, —CH=CH—$C_6R^4H_3$—$NO_2$, —CH=CH—$C_6H_4$—CN, —CH=CH—$C_6R^4H_3$—CN, —CH=CH—$C_6H_4$—$SO_2$, —CH=CH—$C_6R^4H_3$—$SO_2$, —CH=CH—$C_6H_4$—$SO_2O$, —CH=CH—$C_6R^4H_3$—$SO_2O$,
  $R^3$ stands for —H or —$CH_3$, $R^4$ represents an alkyl group having 1–30 carbon atoms, $R^5$ represents an aryl group having 1–30 carbon atoms, $R^6$ represents —H or an alkyl group having 1–3 carbon atoms.

3. An optically non-linear active waveguiding material according to claim 2, characterised in that the donor and acceptor groups-containing triphenylcarbinol satisfies Formula 2:

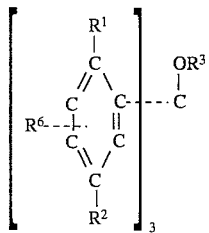

Formula 2 wherein:

$R^1$ stands for —O-alkyl having 1–30 carbon atoms, —O-aryl having 1–30 carbon atoms, —$NH_2$, —$NHR^4$, —$NR^4R^4$, —$NHCOR^4$, —OH, —$O^-$, —SH, —$S^-$, $SR^4$, —$OCOR^4$, —F, —Cl, —I, —Br, —$R^4$, —$R^5$, $R^2$ stands for —$NO_2$, or an aldehyde group having 1–30 carbon atoms, $R^3$ stands for H or —$CH_3$, $R^4$ represents an alkyl group having 1–30 carbon atoms, $R^5$ represents an aryl group having 1–30 carbon atoms, $R^6$ represents —H or an alkyl group having 1–3 carbon atoms.

4. An optically non-linear active waveguiding material according to claim 2, characterised in that the donor and acceptor groups-containing triphenylcarbinol satisfies Formula 3:

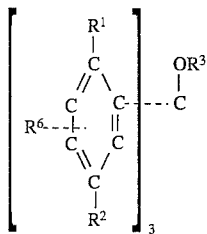

Formula 3 wherein:

$R^1$ stands for —O-alkyl having 1–30 carbon atoms, —O-aryl having 1–30 carbon atoms, —$NH_2$, —$NHR^4$, —$NR^4R^4$, —$NHCOR^4$, —OH, —$O^-$, —SH, —$S^-$, $SR^4$, —$OCOR^4$, —F, —Cl, —I, —Br, —$R^4$, —$R^5$, $R^2$ stands for —CH=CH—$C_6H_4$—$NO_2$, —CH=CH—$C_6R^4H_3$—$NO_2$, —CH=CH—$C_6H_4$—CN, —CH=CH—$C_6R^4H_3$—CN, —CH=CH—$C_6H_4$—$SO_2$, —CH=CH—$C_6R^4H_3$—$SO_2$, —CH=CH—$C_6H_4$—$SO_2O$, —CH=CH—$C_6R^4H_3$—$SO_2O$ $R^3$ stands for —H or —$CH_3$, $R^4$ represents an alkyl group having 1–30 carbon atoms, $R^5$ represents an aryl group having 1–30 carbon atoms, $R^6$ represents —H or an alkyl group having 1–3 carbon atoms.

5. An optically non-linear active waveguiding material according to any one of the preceding claims, characterised in that the optically transparent polymer employed is polymethyl methacrylate or polystyrene.

* * * * *